(12) United States Patent
Valentine et al.

(10) Patent No.: US 6,785,276 B1
(45) Date of Patent: Aug. 31, 2004

(54) SYSTEM FOR TANDEM FREE OPERATION IN PACKET BASED COMMUNICATION

(75) Inventors: Eric Valentine, Plano, TX (US); Josephus Kuster, Plano, TX (US)

(73) Assignee: Telefonaktiebolaget LM Ericsson, Stockholm (SE)

(*) Notice: Subject to any disclaimer, the term of this patent is extended or adjusted under 35 U.S.C. 154(b) by 665 days.

(21) Appl. No.: 09/625,340

(22) Filed: Jul. 25, 2000

(51) Int. Cl.[7] ............................................. H04L 12/28
(52) U.S. Cl. .................. 370/391; 370/358; 370/395.5; 370/465; 370/468; 370/477
(58) Field of Search .................. 370/229, 231, 370/232–234, 400, 401, 411, 464, 466, 467

(56) References Cited

U.S. PATENT DOCUMENTS

| | | | | |
|---|---|---|---|---|
| 5,848,062 A | * | 12/1998 | Ohno | 370/311 |
| 6,108,560 A | * | 8/2000 | Navaro et al. | 370/468 |
| 6,167,040 A | * | 12/2000 | Haeggstrom | 370/352 |
| 6,175,562 B1 | * | 1/2001 | Cave | 370/352 |
| 6,445,697 B1 | * | 9/2002 | Fenton | 370/357 |
| 6,600,738 B1 | * | 7/2003 | Alperovich et al. | 370/352 |

* cited by examiner

*Primary Examiner*—John Pezzlo
*Assistant Examiner*—David Odland

(57) ABSTRACT

A packet-based telecommunication system (100) is disclosed, comprising a first media gateway (124) having a first CODEC structure (130), a second media gateway (126) having a dual function CODEC structure (132), wherein the dual function CODEC structure is adapted to provide tandem free operation between itself and the first CODEC structure, and wherein the dual function CODEC comprises a first element (134) adapted to negotiate tandem free operation, and a second element (136) communicatively coupled to the first element and adapted to selectively convert data coding responsive to the first element.

20 Claims, 1 Drawing Sheet

SYSTEM FOR TANDEM FREE OPERATION IN PACKET BASED COMMUNICATION

FIELD OF THE INVENTION

The present invention relates generally to packet switched communications networks and, in particular, to a system providing efficient transport of coded data over a packet-based core network.

BACKGROUND OF THE INVENTION

The usage of, and demand for, mobile telecommunications continue to increase at a staggering rate. Wireless telecommunications service providers are constantly seeking new ways to improve and expand the services they provide while lowering their investment and operational costs. This ever-increasing demand has driven the development of new and improved topologies and protocols for wireless communications systems. It is now possible to route voice communications, in packetized form, over Internet Protocol (IP) systems conventionally associated with computer data communications. Such capabilities hold the promise increasing efficiency and decreasing costs associated with wireless communications.

Interest grows in IP-based communications as an alternative to conventional circuit switched systems. Circuit switched systems require dedicated channels, reserving an ISUP (ISDN user part) link for any given communication. Therefore, any given call effectively monopolizes a line (e.g. trunk or E1/T1 line) between call origin and destination; requiring a separate line for each call processed. Even in conventional "wireless" communications systems, a call is generally only wireless between the mobile unit and its closest base station, which thereafter typically routes the call on circuit switched infrastructure. For example, in a typical GSM (Global System for Mobile communications) network, once a signal is received at the base station, it is thereafter routed via circuit switched infrastructure to the mobile switching center (MSC) and the rest of the GSM system.

It should thus easily be appreciated that as demand continues to increase, infrastructure associated with circuit switched systems must increase correspondingly. This results in increased system overhead, reduced call volume bandwidth, and increased user costs to cover the additional overhead.

In comparison, IP communications packetize voice data for transmission over existing IP networks; enabling users to communicate (e.g. via phone calls or computer-based conferencing applications) as long as they want for only the cost of the access to the IP network. IP infrastructure is ubiquitous; and use of IP infrastructure is not dedicated (i.e. multiple users utilize, one packet at a time, the same resources), lowering system overhead and use costs.

Although IP network communication is, in some respects, advantageous over circuit switched communication, other considerations limit the commercial usefulness of conventional IP network implementations. Consider, for example, a wireless communications scenario where communication originates in a radio access network (e.g., universal mobile telephony system (UMTS)), is transferred across an IP based core network (backbone), and is delivered to an external, circuit-switched network (e.g., public switched telephone network (PSTN)). Generally, radio access networks typically utilize low bit rate speech encoding (e.g., 13 Kb/s), while traditional circuit switched networks utilize high bit rate speech encoding (e.g., 64 Kb/s). Conversion and formatting from one encoding to the other is required to successfully deliver speech data from one network to the other. The conversion and formatting functions are usually executed by a CODEC (Coder-DECoder).

Conventional communications systems generally perform the conversion from lower bit rate encoding to higher bit rate encoding as the data enters the network backbone. As data from the radio access network enters a media gateway (MGW) that serves as its interface with the IP backbone, the conversion is executed by a CODEC in the media gateway. The data is then transferred across the IP network at the higher bit rate encoding, delivered to another MGW for transfer to the external public network. Thus, the higher bit rate encoded speech must be packetized for transmission over the IP backbone. This is less efficient than packetizing and transmitting the lower bit rate encoded speech, and decreases effective system bandwidth. In many conventional systems, even where the call will terminate in a similar radio access network, speech data is superfluously converted twice: from low to high bit rate upon entering the IP backbone, transmitted over the IP backbone at high bit rate, and from high to low bit rate upon transfer out of the IP backbone. This is obviously inefficient, and degrades overall system performance.

Some previous systems have attempted to overcome these limitations by eliminating the conversion to the higher bit rate altogether. This is typically achieved by negotiation of the CODEC in the terminating MGW (i.e. the one receiving the call) with the CODEC in the originating MGW, whereby each CODEC essentially performs no conversion. Speech data is thus introduced to, transmitted over, and delivered from the IP backbone at the lower bit rate encoding. Although this approach is, in certain ways, advantageous over prior solutions, it is still impractical as it Liz fails in many common call flow scenarios, such as call forwarding to a PSTN. This results in reduced system reliability or, alternatively, system inefficiency due to redundant call processing and constructs.

SUMMARY OF THE INVENTION

From the foregoing, it can be appreciated that a need exists for a providing efficient, reliable, and cost-effective IP network communication in a variety of wireless telecommunication applications. It is desirable that such a system provide robust and versatile structure and methods by which low bit rate encoded data may be transported over a packet based network, even if the destination for the data is a high bit rate external network; overcoming the limitations of conventional systems.

The present invention provides a system for low bit rate encoded data transport over a packet based network, regardless of whether the destination for the data is a low or high bit rate network. The present invention provides a dual CODEC functionality by which conversion to high bit rate encoding is executed after transport across a packet based network, and only when required by the terminating network.

More specifically, the present invention provides a packet-based telecommunication system comprising a first media gateway having a first CODEC structure and a second media gateway having a dual function CODEC structure, wherein the dual function CODEC structure is adapted to provide tandem free operation between itself and the first CODEC structure.

The present invention further provides a dual function CODEC, utilized in packet based telecommunications, comprising a first element adapted to negotiate tandem free operation, and a second element communicatively coupled to the first element and adapted to selectively convert data coding responsive to the first element.

The present invention also provides a method of providing efficient communication between a low bit rate network and a high bit rate network over a packet based network by providing within the packet based network a first CODEC associated with the low bit rate network, providing within the packet based network a second CODEC associated with the high bit rate network, transferring low bit rate data from the first CODEC to the second CODEC, and using the second CODEC to convert the low bit rate data received from the first CODEC to high bit rate data.

BRIEF DESCRIPTION OF THE DRAWINGS

For a more complete understanding of the features and advantages of the present invention, reference is now made to the detailed description of the invention along with the accompanying figure in which.

DETAILED DESCRIPTION OF THE INVENTION

Figure 1:
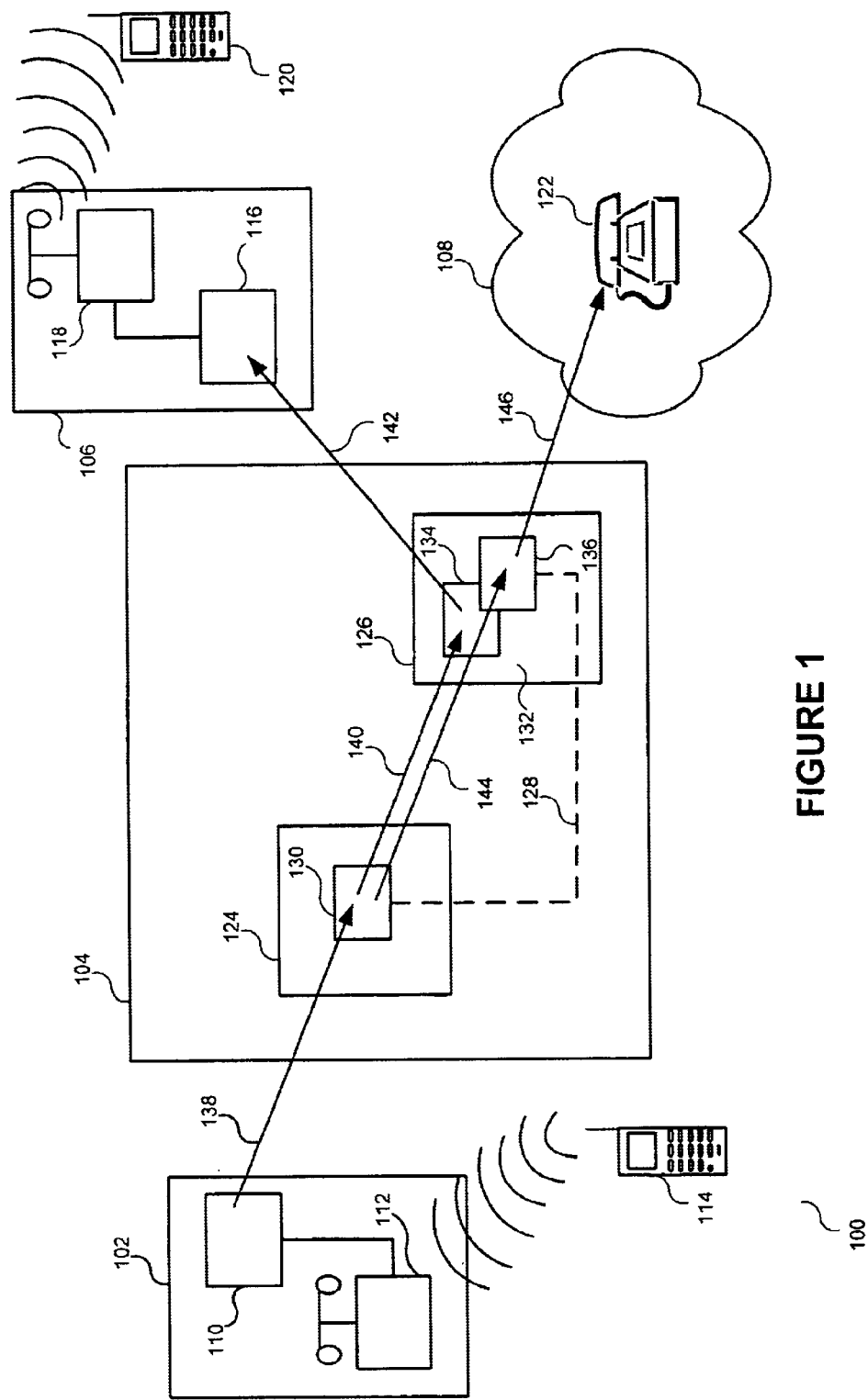
FIG. 1 is an illustrative diagram of one embodiment of a communications network configured according to the present invention.

While the making and the use of the present invention is discussed in detail below, it should be appreciated that the present invention provides many applicable inventive concepts which can be embodied in a wide variety of specific contexts. The specific embodiments discussed herein are merely illustrative of specific ways to make and use the invention, do not delimit the scope of the invention.

The present invention defines a system providing efficient transport of coded data over a packet-based core network, and efficient, reliable, and cost-effective IP network communication in a variety of wireless telecommunication applications. The present invention provides robust and versatile structure and methods by which low bit rate encoded data may be transported over a packet based network, regardless of whether the destination for the data is a low or high bit rate network. The present invention provides a dual CODEC functionality by which conversion to high bit rate encoding is executed after transport across a packet based network, and only when required by the terminating network.

It should be understood that the principles and applications disclosed herein can be applied to a wide range of wireless telecommunications systems where communication across a packet based network between two or more differing bit rate networks is required. The teachings of this disclosure may be applied in adapting a variety of system topologies and protocols. For purposes of illustration and explanation, the present invention is hereafter described in reference to a UMTS access and core network, and UMTS and PSTN terminating networks.

Summarizing briefly, the present invention provides for low bit rate Adaptive Multi Rate (AMR) coded speech to be transferred over a UMTS IP backbone, even if the call will terminate on an external (e.g., PSTN) network. When a UMTS mobile call will terminate on an external network, a tandem free operation (TFO) capable dual CODEC is activated in a MGW interfacing with the external network. The first portion of this dual CODEC attempts negotiating TFO with the CODEC in the MGW interfacing with the access network. If TFO negotiation is successful, low bit rate coded speech can be transported over the backbone network. In that case, the second portion of the dual CODEC translates the low bit rate coded speech into high bit rate coded speech (e.g., 64 Kb/s PCM), before terminating on the external network.

If, however, TFO negotiation between the dual CODEC and the CODEC in the MGW interfacing with the access network is not successful, TFO is negotiated between the 2 potions of the dual CODEC. In this case, 64 Kb/s PCM is transported over the backbone, but no coding is done in the MGW interfacing with the external network.

For a more detailed description, reference is now made to FIG. 1. FIG. 1 depicts a wireless communications system 100 illustrating various aspects of the present invention. System 100 may generally comprise a first access network 102 (e.g., a radio access network), an IP-based core network 104, and a second access network, of similar or different configuration and topology as network 102. Two such varieties of second access networks are illustrated, a radio access network 106 and an external public network (e.g., PSTN) 108.

Network 102 may comprise a radio network controller (RNC) 110 communicatively coupled to one or more base telephony stations (BTS) 112. Each BTS 112 may have one or more mobile subscriber units (i.e. a cell phone) 114 communicatively associated therewith. For purposes of illustration and explanation, network 102 and unit 114 will hereafter be assumed as call origination.

Network 106 may comprise a radio network controller (RNC) 116 communicatively coupled to one or more BTS 118. Each BTS 118 may have one or more mobile subscriber units 120 communicatively associated therewith. Network 108 may comprise a variety of circuit switched and land based infrastructure (not shown), providing communications capabilities to user unit 122.

Network 104 may comprise an originating MGW 124, associated and communicatively coupled with network 102. Network 104 may also comprise a terminating MGW 126, associated and communicatively coupled with either (or both) terminating networks 106 and 108. MSCs 124 and 126 are communicatively coupled together via link 128, which may comprise a variety of other structures and protocols not shown within network 104. MGW 124 comprises a CODEC structure 130. MGW 126 comprises a dual function CODEC structure 132. Structure 132 comprises first element 134 and second element 136. Elements 134 and 136 may comprise separate CODEC structures that inter-operate to functionally render structure 132, or elements 134 and 136 may comprise distinct functional portions of a single CODEC structure 132.

As communication is initiated by unit 114 through network 102, low bit rate encoded data (e.g., 13 Kb/s) is transferred over 138 to CODEC 130. Assuming that the call destination is unit 120 in network 106, which is of a compatible data encoding to network 102, the data does not require conversion to high bit rate encoding. Element 134 negotiates with CODEC 130, via link 128, for both to abstain from any code conversion. Thus, the tandem of CODEC 130 and CODEC element 134 are free from coding operation, hence tandem free operation (TFO). The data transfers 140, in 13 Kb/s format, over the IP backbone to element 134, where it is then transmitted 142 to network 106 for delivery to the terminating unit 120. Bandwidth for the transfer 140 is thus increased by nearly 500%.

Assuming now that the call destination is unit 122 in network 108, the call data will require conversion to 64 Kb/s before entering network 108. The present invention, however, attempts to transport the data across the IP backbone via TFO (at the low bit rate encoding); realizing improved bandwidth advantages and performing the code conversion just before delivery to external network 108. Element 134 attempts negotiating TFO with CODEC 130. If TFO negotiation is successful, the data transfer 144 between CODECs 130 and 132 is low bit rate coded speech. After that transfer, element 136 translates the low bit rate coded speech into high bit rate coded speech before transfer 146 to terminating network 108.

If TFO negotiation between element 134 and CODEC 130 is not successful, CODEC 130 performs conversion to high bit rate encoded data and transfer 144 is at the high bit rate. TFO is negotiated between elements 134 and 136, such that no further coding is done to the data in MGW 126 before transfer 146 to terminating network 108.

The present invention thus provides independent CODEC elements; one performing TFO negotiation and establishing low bit rate transfers over the packet based backbone, and that may be switched in to provide conversion to high bit rate encoding when required. Thus, the limitations of conventional systems (e.g., in call forwarding scenarios) are overcome.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. For example, although the present invention has been described herein within the context of UMTS wireless and PSTN telecommunications networks, the present invention may be implemented in any of a number of different telecommunications systems. The description as set forth is not intended to be exhaustive or to limit the invention to the precise form disclosed. Many modifications and variations are possible in light of the above teaching without departing from the spirit and scope of the following claims.

What is claimed is:

1. A packet-based telecommunication system connected to a first radio access network compatible with transporting low bit rate encoded data, a second radio access network compatible with transporting said low bit rate encoded data, and an external telecommunications network compatible with transporting high bit rate encoded data, comprising:
    a first media gateway having a first CODEC structure and communicates with said first radio access network;
    a second media gateway having a dual function CODEC structure and selectively communicates with said second radio access network and said external communications network;
    wherein said first media gateway transports low bit rate encoded data received from said first radio access network to said second media gateway without performing any CODEC conversion by said first CODEC; and
    in the event said low bit rate encoded data are intended for said second radio access network, the dual function CODEC structure within said second media gateway is adapted to provide tandem free operation between itself and the first CODEC structure by communicating said received low bit rate encoded data to said second radio access network; otherwise,
    said dual function CODEC structure within said second media gateway converting said low bit rate encoded data into high bit rate encoded data and communicating said converted high bit rate encoded data to said external communications network.

2. The system of claim 1 wherein the dual function CODEC structure further comprises:
    a first element adapted to negotiate tandem free operation; and
    a second element communicatively coupled to the first element and adapted to selectively convert data coding responsive to the first element.

3. The system of claim 2 wherein the first and second elements are separate CODEC structures.

4. The system of claim 3 wherein said first element operates at a different bit rate than said second element.

5. The system of claim 2 wherein the first and second elements are portions of a single CODEC structure.

6. The system of claim 1 wherein the radio access network is a UMTS based network.

7. The system of claim 1 wherein the second radio access network is a UMTS based network.

8. The system of claim 1 wherein the radio access network transfers coded data at a 13 Kb/s rate.

9. The system of claim 8 wherein the external communication network transfers coded data at a 64 Kb/s rate.

10. The system of claim 1 wherein said dual function codec is adapted to perform coding at two different bit rates.

11. A method of providing efficient communication between a first low bit rate network and a high bit rate network or with a second low bit rate network over a packet based network, comprising the steps of:
    providing within the packet based network a first CODEC associated with the low bit rate network;
    providing within the packet based network a second CODEC associated with the high bit rate network a second low bit rate network;
    transferring low bit rate data received from said first low bit rate network to the second CODEC over said packet based network without performing any CODES conversion by said first CODEC; and using the second CODEC to convert the low bit rate data received from the first CODEC to high bit data if said data is intended for said high bit rate network and transferring said converted high bit rate data to said high bit rate network; otherwise, performing a tandem free operation by transferring said low bit rate data to said second low bit rate network if said data is intended for said second low bit rate network.

12. The first and second low bit rate networks of claim 11 include radio access networks within a mobile communication system.

13. The radio access network of claim 12 transfers coded data at a 13 Kb/s rate.

14. The high bit rate network of claim 11 includes an external public network transferring coded data at a 64 Kb/s rate.

15. The second CODEC of claim 11 includes a dual function CODEC for selectively performing said tandem free operation or converting to said high bit rate data.

16. A packet based communication system for providing efficient communication between a first low bit rate network and a high bit rate network or with a second low bit rate network, comprising:

a first media gateway within tee packet based network for communicating with said first low bit rate network, said first media gateway further associated with a first CODEC;

a second media gateway within the packet based network for communicating with said second low bit rate network and said high bit rate network, said second media gateway further associated with a second CODEC;

wherein said first media gateway transferring low bit rate data received from said first low bit rate network to the second CODEC over said packet based network without performing any CODEC conversion by said first CODEC; and wherein said second CODEC associated with said second media gateway converting the received low bit rate data to high bit rate data if said data is intended for said high bit rate network and transferring said converted high bit rate data to said high bit rate network; otherwise, said second media gateway performing a tandem free operation by transferring said low bit rate data to said second low bit rate network without any CODEC conversion.

17. The first and second low bit rate networks of claim 16 include radio access networks within a mobile communication system.

18. The radio access network of claim 16 transfers coded data at a 13 Kb/s rate.

19. The high bit rate network of claim 16 includes an external public network transferring coded data at a 64 Kb/s rate.

20. The second CODEC of claim 16 includes a dual function CODEC for selectively performing said tandem free operation or converting to said high bit rate data.

* * * * *